United States Patent Office 3,544,176
Patented Dec. 1, 1970

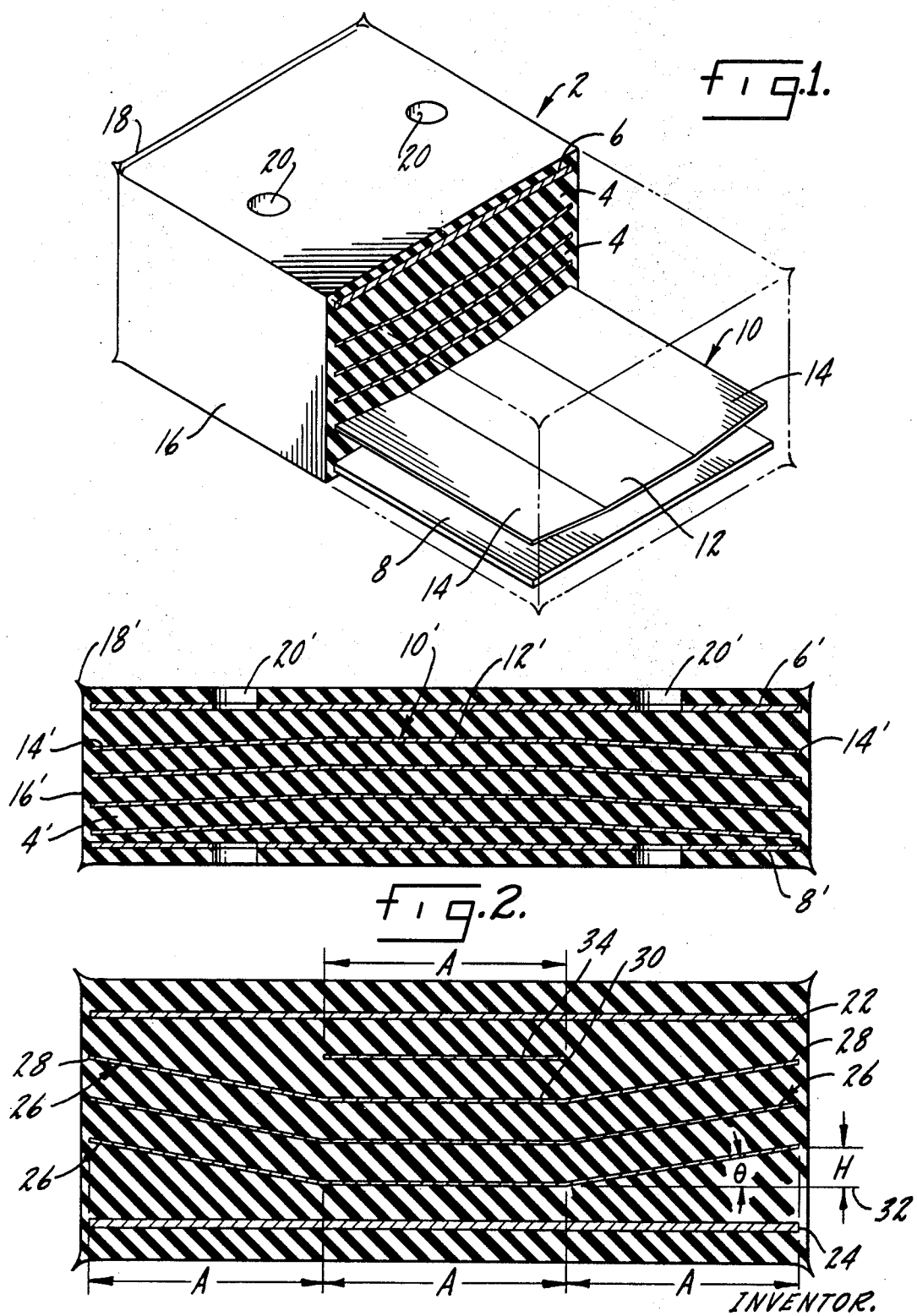

3,544,176
BRIDGE BEARINGS WITH PLATES HAVING NONPLANAR ENDS
William M. Slater, Toronto, Ontario, Canada, assignor to Conenco International Limited, a Canadian corporation
Filed Dec. 11, 1968, Ser. No. 782,848
Int. Cl. F16c 29/02; E01d 19/04
U.S. Cl. 308—3            12 Claims

ABSTRACT OF THE DISCLOSURE

A bearing pad or block structure for use in supporting bridges and the like which comprises the use of reinforcing plates of metal or fiber construction having end portions which bend downward or upward, which plates are interleaved between elastomer layers of the bearing structure. The plates having nonplanar end portions permits desired K or transverse shear factor ratings while not substantially increasing the thickness of the bearing and provides other ideal characteristics. In another embodiment a center or equalizing plate is positioned along the axis of the bearing so as to obtain a better distribution of shear stresses.

BACKGROUND OF THE INVENTION

This invention relates to bearings for bridges, girders, bridge-like structures and pertains specifically to bearings of the type which permit a certain amount of movement between the object that is being supported and the support upon which the bearing rests. Basically the bridge bearings of this invention pertains to those having an enclosed, multi-layer construction of reinforcing plates of metal or fiber construction and elastomer layers. The bearing is referred to as monolithic in the trade and is produced by bonding all the steel and elastomer layers in one vulcanizing operation.

The prior art has for some time been aware of the utilization of straight or parallel metal plates in such bearing pads or blocks. There has even been some suggestion made that for various reasons the plates take the form of chevrons (a V-shaped configuration having a pointed midsection), arcuate members, and other such designs. However, in each of these particular designs there has been some limitations imposed upon the ultimate bearing and the characteristics desired in such a bearing. That is where chevron-shaped plates are used in order to obtain a desired end effect, as for instance by desiring a specific transverse shear factor or K value, the overall thickness of the bearing has to be increased. In this regard, with the herein disclosed invention, the utilization of reinforcing plates having straight or parallel midsections and having end portions which slope downwardly or upwardly (and in one embodiment of the bearing utilizing one or a plurality of center or equalizing plates) it is possible to obtain selected K values. Different K values are obtained merely by varying the angle of each of the end sections of each of the plates with respect to its midsection. In other words, reinforcing plates are used which are characterized as having non-planar ends. The nonplanar ends forming a selected angle θ with respect to a line extended from the center portion of the plate.

SUMMARY OF THE INVENTION

Basically the bearing pad or block used in conjunction with bridges or other structures of this invention includes interleaved layers of resilient material such as natural or synthetic rubbers and rigid sheet members normally taking the form of metal or steel plates or fibrous plates, the plates being characterized as having nonplanar ends with respect to their center. In one embodiment at least one center or equalizing plate having a specific cross-sectional length with respect to the other reinforcing plates is utilized so as to provide the desired distribution of shear stresses.

BRIEF DESCRIPTION OF THE DRAWINGS

FIG. 1 is a perspective view, partially sectioned and broken away, of a specific type of bearing in accordance with this invention;
FIG. 2 is a cross-section of one embodiment of the invention; and
FIG. 3 is a cross-section of still another embodiment of bearings of this invention.

DESCRIPTION OF THE PREFERRED EMBODIMENTS

Referring specifically to the drawings wherein like numerals of reference indicate like numerals throughout and referring specifically to FIG. 1, there is shown a rectangularly-shaped bearing 2 comprising interleaved layers of resilient material such as rubber having an uppermost straight or parallel reinforcing plate 6 and an equivalent lower plate 8. Disposed between the upper and bottom parallel plates 6 and 8 are a plurality of sheet members 10 each having midsections 12 parallel to the upper surface of the bearing or the upper reinforcing plate 6. Plates 10 have nonplanar extending portions 14 each being nonplanar with respect to the center portion of each plate 12.

In this particular instance the bearing 2 has bonded to the interior, interleaved sections 4 an external covering or casing 16 of resilient material such as rubber or neoprene. Around the upper and bottom portions of the bearing 2 are lip extensions of the outer casing 16 indicated at 18 which provide a comformable sealing lip for the structure to be supported, such as a bridge, and the concrete, steel or other material member which supports the bearing and bridge, such as for instance, a pillar, etc. Where deemed desirable, the casing 16 may be omitted as where non-corrodible plates are employed or where the interleaved sections 4 are of neoprene or the like material. Provided in the upper surface of the bearing 2 are spaced dowel or pin holes 20 which extend to and through the upper plate 6. Similarly the bottom surface of the bearing pad and the bottom plate 8 have similarly disposed holes for receiving pins or other extensions from the bridge and supporting the structure so as to locate and retain the bearing pad in rigid relation between supporting structure and structure to be supported.

Referring to FIG. 2, it is seen that an identical type of bearing structure as illustrated and described in FIG. 1 is shown with the sole exception that instead of sloping upwardly the end portions of the individual reinforcing plates have a downward slope. The prime numbers desinate like elements found in and described for FIG. 1. In all other aspects the bearing of FIG. 2 is identical to that of FIG. 1. It is clear in what manner the pin holes are disposed through the upper elastomer layer and uppermost parallel reinforcing plate.

Referring now to FIG. 3 there is illustrated still another embodiment of the invention which in this case is similar in design and construction with that previously described for FIG. 1. There is provided between the upper and lower reinforcing plates 22 and 24 three spaced reinforcing plates 26 having nonplanar ends 28 and straight or parallel midsections 30. The cross-sectional length of each of the midsections 30 is equal in length to A whereas the total cross-sectional length of the plates 26 is equal to 3A and the slope of the extending or nonplanar portions 28 makes an angle θ with respect to a line 32 extended from the midsection or straight portion 30 of each of the plates 26. The slope of the individual plates 26 at the ends is determined by the relationship $$\theta = \tan^{-1} H/A$$

where A is equal to the cross-sectional length of the midsection 30 and H is the projected height of the non-planar portion 28 with respect to the line 32. Disposed between the upper reinforcing plate 22 and the first of the bent plates is a center or equalizing reinforcing plate 34 having a cross-sectional length equal to that of midsection 30, or in this case A.

It has been found that providing individual plates 26 with the configuration herein described increases the transverse or shear rating or resistance $K_t$ over the longitudinal shear rating $K_l$. Sections shown in FIGS. 2 and 3 are transverse sections. Thus, the K factor $(K_t/K_l)$ or what may be termed the transverse shear factor, is increased. This allows for a wide variation and selection in K values and where the K values are large, the angle $\theta$ can be increased so as to obtain the maximum desired results. With other chevron, V-shaped, arcuate or other type reinforcing plates this is not possible without substantially increasing other dimensions of the bearing or obtaining other undesired effects.

Generally speaking it is desirable that the sheets or plates having the nonplanar portions by symmetrical, i.e., where A equals the cross-sectional length of the straight or planar portion of the bent plate and is also equal to the projected length of the bent or nonplanar portions of the plate. However, it is possible to have each one of these three lengths, (i.e., projected length of the nonplanar portions and length of the mid- or planar portion) unequal from each other. In some instances, a ratio may be desirable where the projected length of the nonplanar ends are equal but each of the projected lengths is unequal in length to the midsection or straight portion of the reinforcing plate or plates. What is desirable and what has been found to provide the attributes to the particular type of bridge bearings herein under discussion is the fact that reinforcing plates or sheet members are used that have nonplanar ends regardless of their respective lengths or relation to the straight or parallel mid-portions of their plate or sheet members.

By use of the center on equalizing plate such as 34 either in singular or plural form there is obtained a more equal distribution of shear stresses at the edges or the longitudinal axis of the bearing. It has also been found that the stability about the vertical longitudinal axis in this design is greater than in all other existing designs and, of course, it should be understood that the bearings may take any polygonal configuration such as circular, triangular, trapezoidal, etc.

While rectangularly-shaped bearings have been illustrated and described having planar upper and lower surfaces, it is, of course, possible that specific installations will require that these surfaces not be parallel. Bearings having circular, elliptical, etc. shapes in plan are contemplated and such structures are indeed possible and desirable following the teachings of the herein disclosed invention. The method of forming the monolithic layer, the specific materials used in making up the monolithic structure, as well as others matters, such as the forming of the metal or fiber plates, are matters which are well known to those of ordinary skill in the bridge bearing art and since no inventive claim is laid thereto, these matters will not be discussed.

A bridge bearing having the specific configuration as that depicted in FIG. 1 was constructed and had the following physical characteristics:

Overall cross-sectional width, 24 inches; the upper and lower parallel reinforcing plate members were of steel of .125 inch thickness; four bent plates were disposed between the upper and lower parallel plates, the uppermost one being spaced approximately one inch from the upper parallel plate and each of the plates having nonplanar end portions spaced from one another at the parallel center sections by .610 inch, the lowermost plate having the bent portions being spaced from the lower reinforcing parallel plate by approximately .500 inch. The bent plates were of steel construction and were .08 inch thick. The overall size of the bridge bearing was 24 inches in cross-sectional width, 20 inches in length and 4.500 inches in thickness. The bearing thus formed was found to display superior characteristics over similarly constructed bearings utilizing straight or parallel plates over their whole extent.

Thus, by the foregoing invention, bridge bearings and like structures having the most desirable characteristics are made available while not substantially increasing the size thereof as well as not having some of the undesirable characteristics inherent in bridge bearings of conventional design.

The embodiments of this invention in which an exclusive property or privilege is claimed are defined as follows:

1. A bearing for bridges or other structures comprising a block or pad which includes interleaved layers of resilient material and rigid sheet members, at least one of said sheet members comprising planar portions having a mid-portion span substantially parallel to the upper surface of said pad and nonplanar sloping ends with respect to said mid-portion span.

2. The bearing in accordance with claim 1 wherein said at least one of said sheet members is of plate metal and where more than one sheet member with nonplanar ends is present, each of the sections of said sheet members having nonplanar ends are parallel to the corresponding sections of adjacent sheet members.

3. The bearing in accordance with claim 2 wherein the nonplanar ends slope downwardly with respect to the upper surface of said bearing.

4. The bearing in accordance with claim 2 wherein the nonplanar ends slope upwardly with respect to the upper surface of said bearing.

5. The bearing in accordance with claim 3 wherein each of the metal plates having nonplanar ends has a center section parallel to the upper surface of said bearing equal in length to one-third of the total projected length of said metal plate.

6. The bearing in accordance with claim 5 wherein the slope of the end portions of each of said metal plates having nonplanar ends is determined by the formula:

$$\theta = \tan^{-1} H/A$$

where:

$\theta$ = the angles between a line in the same plane as the center portion of said metal plate and the sloping end portion of said metal plate;
H = the distance between the furthest end portion of said sloping plate and said base line determined by said center portion of said metal plate; and
A = the cross-sectional width of said nonplanar plate.

7. A bearing for bridges or other structures comprising a block or pad which includes interleaved layers of resilient material and sheet members comprising a pair of spaced substantially rigid sheet members being parallel to one another and to the upper surface of said pad having disposed therebetween, at least one sheet member of metal plate having nonplanar ends and having a center section parallel to the upper surface of said pad and being equal in length to one-third of the total projected length of said metal plate, the said nonplanar ends sloping downwardly with respect to the upper surface of said bearing, the slope being determined by the formula:

$$\theta = \tan^{-1} H/A$$

where:

$\theta$ = the angles between a line in the same plane as the center portion of said metal plate and the sloping end portion of said metal plate;

H=the distance between the furthest end portion of said sloping plate and the base line determined by said center portion of said center portion of said metal plate, and
A=the cross-sectional width of said nonplanar plate, and when more than one sheet member with nonplanar ends is present, each of the sections thereof are parallel to the corresponding sections of adjacent nonplanar ends sheet members.

8. The bearing in accordance with claim 7 wherein said bearing is of rectangular configuration and wherein a center equalizing plate is spaced between the upper most parallel plate and the first of the series of sheet members having non-parallel ends.

9. The bearing in accordance with claim 8 wherein the cross-sectional length of said center plate is equal in length to the center portion of each of said sheet members having nonplanar ends.

10. The bearing in accordance with claim 9 wherein the cross sectional length of said center plate is equal to A and there are at least three sheet members having nonplanar ends disposed between the two parallel plates.

11. The bearing in accordance with claim 10 wherein a neoprene casing is bonded to the natural or synthetic rubber portion of said bearing interior and a sealing lip is provided on the upper and lower surfaces.

12. The bearing in accordance with claim 11 wherein there is a sufficient number of center plates to maintain the equal distribution of shear stresses at the longitudinal axis of said bearing.

References Cited

UNITED STATES PATENTS

| | | | |
|---|---|---|---|
| 2,557,610 | 6/1951 | Meyers et al. | 248—21 |
| 3,243,236 | 3/1966 | Graham | 308—3 |
| 3,375,763 | 4/1968 | Welch | 94—18 |

FOREIGN PATENTS

| | | | |
|---|---|---|---|
| 696,512 | 10/1964 | Canada | 14—16 |
| 1,499,351 | 9/1967 | France | 308—3 |

MANUEL A. ANTONAKAS, Primary Examiner

U.S. Cl. X.R.
14—16; 267—152